United States Patent

[11] 3,588,418

| [72] | Inventor | Edward Chiffey<br>Bolton, England |
| --- | --- | --- |
| [21] | Appl. No. | 796,735 |
| [22] | Filed | Feb. 5, 1969 |
| [45] | Patented | June 28, 1971 |
| [73] | Assignee | Robert Watson & Company<br>(Constructional Engineers) Limited<br>fractional part interest |
| [32] | Priority | Feb. 7, 1968 |
| [33] | | Great Britain |
| [31] | | 5994/68 |

[54] AUTOMATIC WELDING APPARATUS
7 Claims, 6 Drawing Figs.

| [52] | U.S. Cl. | 219/98 |
| --- | --- | --- |
| [51] | Int. Cl. | B23k 9/20 |
| [50] | Field of Search | 219/98, 99, 95, 62 |

[56] References Cited
UNITED STATES PATENTS

| 3,073,947 | 1/1963 | Mortenson et al. | 219/98 |
| --- | --- | --- | --- |
| 3,448,237 | 3/1969 | Logan | 219/98 |

*Primary Examiner*—J. V. Truhe
*Assistant Examiner*—R. E. O'Neill
*Attorney*—Holman and Stern ABSTRACT: An automatic welding apparatus for welding studs to a beam comprising a wheeled carriage having a number of welding guns mounted thereon, each welding gun is arranged to be raised and tilted from an operative or welding position to a stud accepting position in which the gun is automatically cut off from its electric supply. The carriage is movable along the beam by means of a reciprocating gripper arrangement on the carriage which engages a stud welded to the beam and drags the carriage along the beam.

PATENTED JUN 28 1971 3,588,418
SHEET 1 OF 2
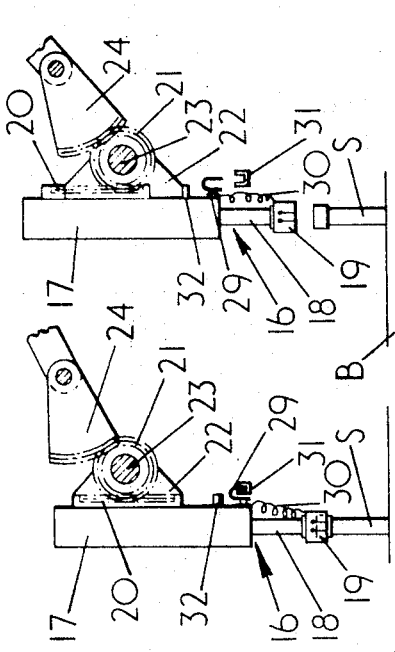
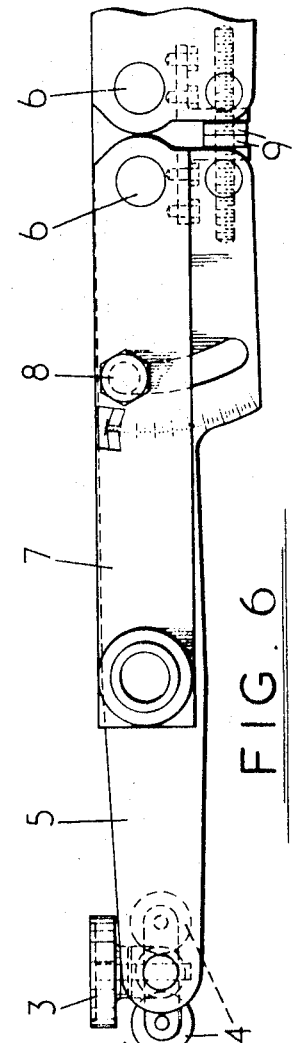
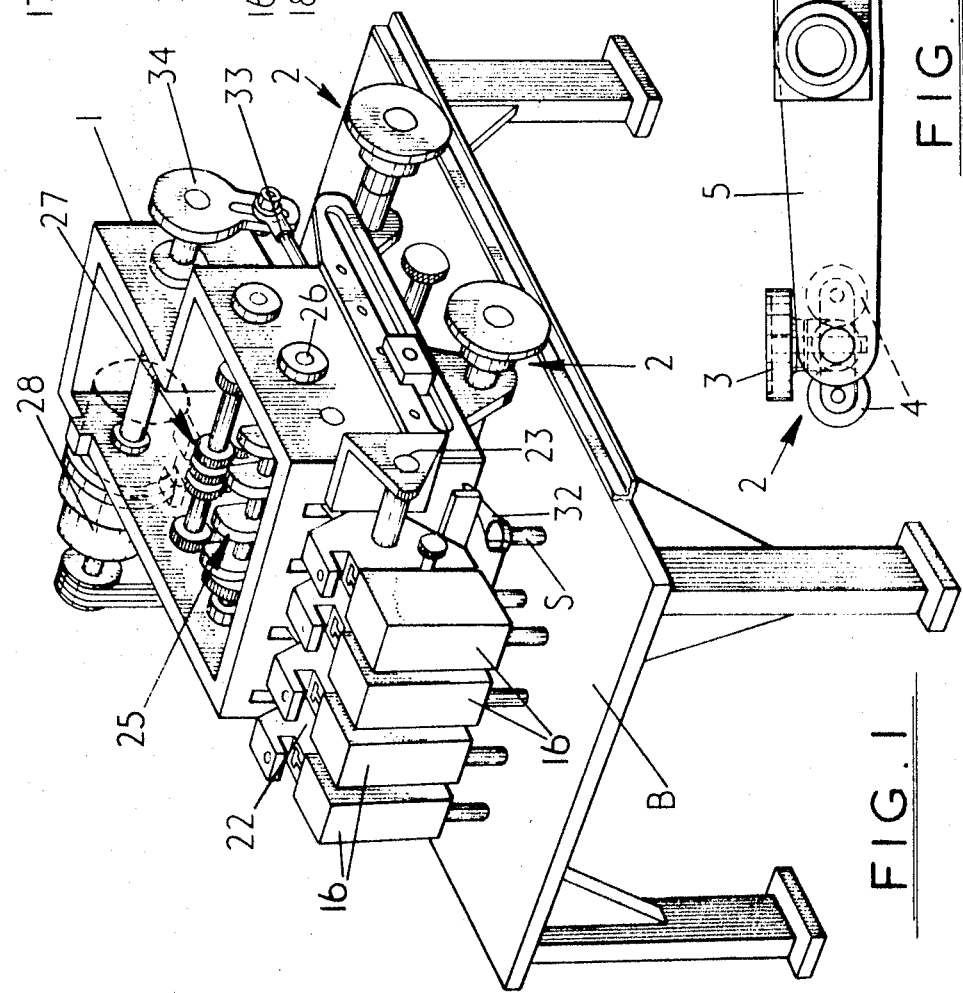

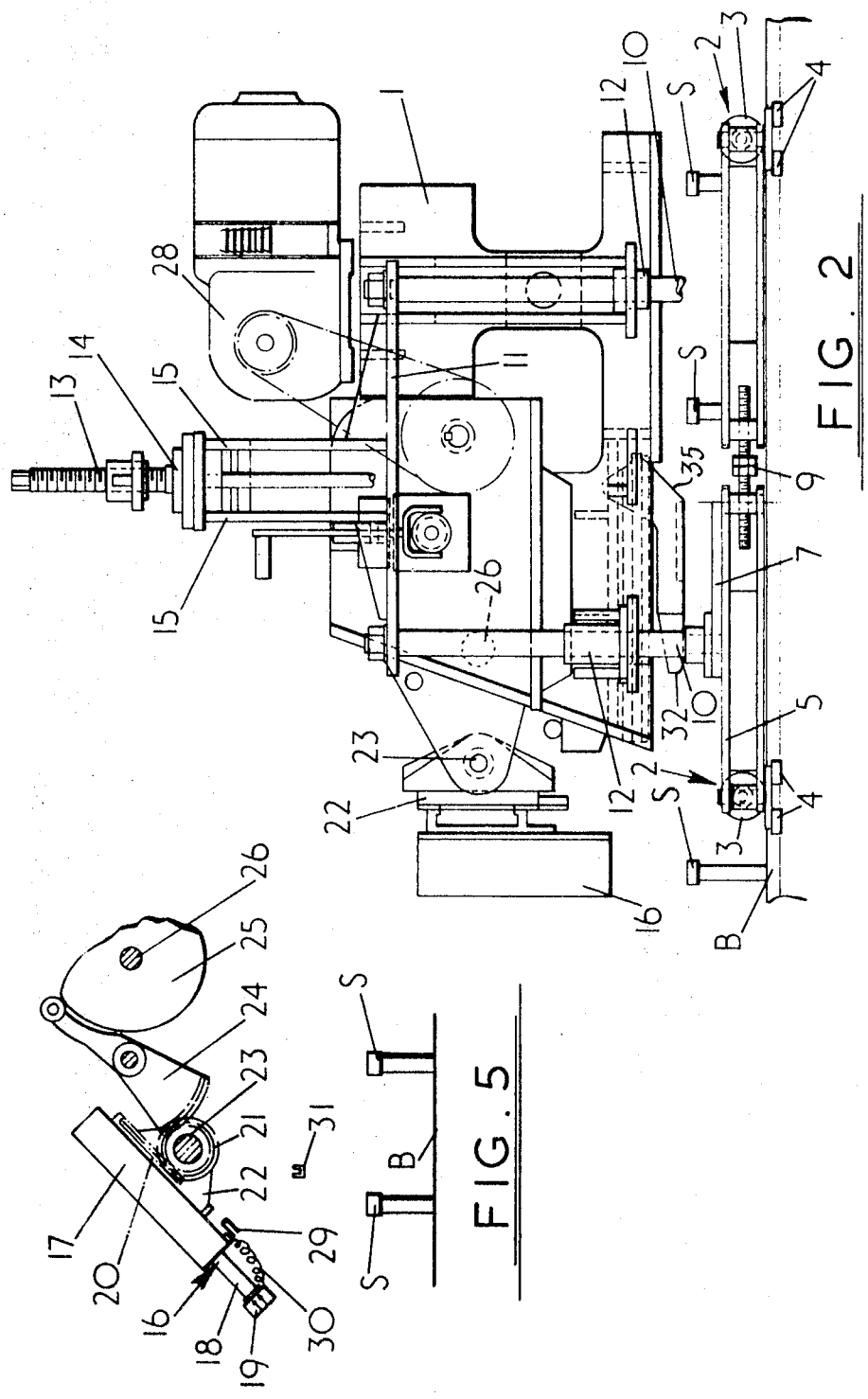

AUTOMATIC WELDING APPARATUS

This invention relates to automatic welding apparatus and particularly to automatic welding apparatus for electrically welding studs, pins or the like (hereinafter to be referred to simply as studs) to beams, girders, plates or the like (hereinafter to be referred to simply as beams) using semiautomatic welding guns of known construction.

An object of the present invention is to provide an automatic welding apparatus which is efficient in operation, renders marking-out and measuring operations unnecessary, and in which a plurality of welding guns are automatically controlled.

According to the present invention there is provided an automatic welding apparatus for welding studs to a beam, comprising a carriage movable along the beam, means for moving the carriage along the beam, a plurality of welding guns mounted on the carriage, means for tilting each welding gun from a welding position to a stud-accepting position, and electrical contact means positioned so as to supply electric current to each welding gun in turn when in its welding position but to be electrically isolated therefrom when in its stud-accepting position, each said tilting means comprising a rack connected with its respective welding gun, a pinion meshing with the rack, a trunnion carrying said pinion and mounting the welding gun so as to be slidable relative thereto when relative movement between the rack and pinion occurs upon rotation of the pinion, an axle carrying said pinion and pivotally mounting the trunnion on the carriage and means for limiting sliding movement of the rack relative to the trunnion upon rotation of the pinion so that further rotation of the pinion causes the welding gun to be tilted about the axis of the axle.

Embodiments of the present invention will now be described, by way of example, with reference to the accompanying drawings, in which:

FIG. 1 is a simplified perspective schematic view showing the general features of an automatic welding apparatus according to the present invention shown on a setting table, FIG. 2 is a part cutaway side view of a practical embodiment of the welding apparatus of FIG. 1 with similar parts similarly numbered, FIGS. 3 to 5 are schematic views of a mechanism for raising and tilting welding guns on the apparatus of FIGS. 1 and 2, and FIG. 6 is a plan view of a mechanism for adjusting each wheel assembly of the apparatus shown in FIG. 2.

An automatic welding apparatus for welding studs S to a beam B (FIG. 2) comprises a carriage consisting of a rectangular boxlike frame 1 having adjacent each corner of the base thereof an assembly 2 of three wheels. Each wheel assembly 2 (FIG. 2) is capable of being adjusted vertically and horizontally (FIG. 6) to enable the carriage to ride on beams of varying widths and to cope with studs of different lengths. Each wheel assembly 2 consists of one wheel 3 operating in a vertical plane to support the carriage on the top face of the beam B and two smaller wheels 4 operating in a horizontal plane and adapted to contact the sides of the beam B to guide the carriage along the length of the beam B.

The wheels 3 and 4 of each assembly 2 are mounted on an arm 5 attached through a vertical pivot 6 to a beam 7. A clamping bolt 8 engages a screw-threaded bore in the arm 5 having passed through an arcuate slot in the beam 7.

Each beam 7 mounts two wheel assemblies which are movable in a horizontal direction by turning a pair of hexagon bolts 9 welded together head-to-head. One of the bolts 9 has a left-hand thread whilst the other has a right-hand thread and each bolt 9 cooperates with an internally screw-threaded hole in a bush in each arm 5 spaced from the pivot 6. Rotation of the bolts 9 causes the arms 5 to be pivoted in a horizontal arc about the pivot 6, when the clamping bolts 8 are loosened. Tightening of the bolts 8 locks the arms 5 in position so that the desired wheel track can be obtained. This adjustment would normally be carried out on the setting table shown in FIG. 1.

Vertical adjustment of the wheel assemblies is best described with reference to FIG. 2, at each side of the apparatus there is provided a pair of spaced vertical shafts 10 attached at the bottom to the beam 7 and interconnected at the top by a bar 11. The shafts 10 are slidable in collars 12 attached to the frame 1 of the apparatus. A central vertical screw-threaded rod 13 rotatable on the frame 1 cooperates with a nut 14 attached by means of supports 15 to the bars 11 on each side of the apparatus. Thus, rotation of the screw-threaded rod 13 causes the shafts 10 to slide in the collars 12 to effect vertical adjustment of the wheel assemblies 2 i.e. adjustment of the clearance between the frame 1 and the beam B in order to accommodate variation in the length of stud S to be welded.

On the front face of the carriage are mounted four welding guns 16 of known form. Any desired number of welding guns may, of course, be employed.

Each welding gun 16 (see FIGS. 3 to 5) has a body 17 having an arm 18 on the end of which is mounted a spring collet 19 for holding a stud S to be welded. To the body 18 of each welding gun 16 is attached a rack 20 meshing with a pinion 21 carried by a trunnion 22 which mounts the welding gun 16 so as to be slidable relative thereto when relative movement between the rack 20 and the pinion 21 occurs. The trunnion 22 is mounted on the carriage through the intermediary of an axle 23 carrying the pinion 21. In this way, the trunnion 22, and hence the welding gun 16 is pivotable in a vertical plane about the axle 23.

The pinion 21 also meshes with a gear quadrant 24 arranged to be moved by a cam 25, each cam 25 being mounted on a shaft 26 which is operatively connected with a gear system indicated generally at 27 (FIG. 1) driven by an electric motor 28 on top of the carriage.

The gear system 27 may transmit power from the motor 28 to four separate camshafts, one for each of the four welding guns as an alternative.

On the body 17 of each welding gun 16 is mounted an electrical contact 29 (see FIGS. 3 to 5) electrically connected via a flexible lead 30 to the spring collet 19. The electrical contact 29 is of inverted U-form and is arranged to engage in a groove in a bus bar 31 mounted on the carriage when the welding gun 16 is in a stud welding position i.e. in which it is vertically disposed in a lowered position as shown in FIG. 3.

Each welding gun 16 operates as follows:

Assuming the welding gun 16 to be in its welding position (as shown in FIG. 3), operation of the appropriate cam 25 causes the gear quadrant 24 to rotate the pinion 21 and, due to the fact that the spring collet 19 is around the head of a stud S which has just been welded to the beam B and that the electrical contact 29 is engaged with the grooved bus bar 31, the welding gun 16 cannot be pivoted forward about the axle 23 relative to the direction of movement of the carriage but is lifted vertically due to relative movement between the rack 20 and the pinion 21 until a stop pin 32 mounted on the body of the welding gun 16 (see FIG. 4) engages the trunnion 22. In this position, the electrical contact 29 has been lifted clear of the groove in the bus bar 31 and the spring collet 19 no longer engages the welded stud S. Further movement of the gear quadrant 24 causes the welding gun 16 to be pivoted or tilted forward in a vertical plane about the axle 23 to a position (see FIG. 5) in which an operator can insert a fresh stud and ferrule in the spring collet. The reverse movement of the welding gun 16 containing its fresh stud from the stud-accepting position to the welding position is effected in the reverse manner to that described above. As described above, the welding gun 16 is automatically supplied with current through the bus bar 31 but only when it is in its welding position.

A movable gripper is also provided on the carriage to enable the apparatus to move forward to another location at which studs are to be welded to the beam.

The gripper comprises a claw 32 for engaging a welded stud S, mounted under the carriage to be reciprocated in a horizontal direction by a connecting rod 33 movable by an indexing crank 34 (see FIG. 1) driven by the motor 28.

The claw 32 as shown in FIG. 2 has an inclined front face 35 so that during its forward movement the inclined front face 35 can ride over a welded stud S and then drop down over the stud to engage the latter so that upon backward movement of the claw 32, the carriage is dragged forward until it reaches the next location at which a stud or studs is or are to be welded to the beam.

The operations performed under the control of the camshaft and gear system are as follows:

1. Moving each welding gun from its welding position to its stud accepting position in the manner described above.
2. Operating of the gripper to a position in which the claw 32 engages the first set of studs welded and drags the carriage along the top of the beam to a position at which the next row of studs is required to be welded. When this position is reached the carriage is held rigidly in position.
3. Moving each welding gun from its stud accepting position to its welding position in the manner described above.

Owing to electrical limitations it is desirous to space out in time the operation of each gun and the cams are timed to operate each gun in sequence of, for example 10 seconds, so that the electrical equipment is not overloaded.

The cycle of operation of the welding guns is:
Raise and tilt No. 1 Gun into its stud accepting position.
Insert stud and ferrule in gun.
Raise and tilt No. 2 Gun into its stud accepting position.
Insert stud and ferrule in No. 2 Gun.
Raise and tilt No. 3 Gun into its stud accepting position.
Insert stud and ferrule in No. 3 Gun.
Raise and tilt No. 4 Gun into its stud accepting position.
Insert stud and ferrule in No. 4 Gun.

The gear system then goes through the cycle of advancing the carriage to its next position, but because at this stage there are no studs welded to the beam, no actual movement takes place since the claw 32 does not engage a stud. During the cycle time for the carriage to advance, all the welding guns are in their stud accepting position.

Then continued motion of the cams 25 causes:
1. No. 1 Gun to move into its welding position from its stud accepting position and to weld a stud to the beam.
2. No. 2 Gun 10 seconds after to repeat.
3. No. 3 Gun 10 seconds after No. 2 to repeat.
4. No. 4 Gun 10 seconds after No. 3 to repeat.

In order to save time and to expedite production, No. 1 Gun is arranged not to wait until all the other guns have welded their studs before it returns to its stud accepting position, but to return immediately after completing its own weld, in fact, whilst another gun is moving downwards to its welding position. This allows an operator ample time to load the next stud and ferrule into the spring collet ready for further welding operations.

Since there is a row of studs welded in position, the carriage is advanced by the claw 32 its grippers gripping the heads of the newly welded studs and by means of its backward motion, pulls the carriage to the position at which the next row of studs is required.

The welding operation can be effected at two speeds, the speed selection being effected by operation of a lever 36 (FIG. 2) which enables different gear ratios in the gear system to be selected. The cams operating the gear quadrant have a separate profile on each side so that when the lever 36 is shifted the cam profile appropriate to the speed is selected.

The cam followers of the gear quadrant 24 are thus engageable with either one of the two facing cam profiles on two adjacent cams.

Thus adjustments are provided:
1. For varying pitch of studs across the girder by adjustment of the welding guns along the shaft 23.
2. For varying pitch of studs longitudinally along the girder by adjusting the length of movement of the claw 32.
3. For accommodating variations in the widths of beams.
4. For accommodating variations in the lengths of the studs by adjustment of the clearance between the carriage and the beam.

The operations performed by the gear system and camshaft may, of course, be performed hydraulically, pneumatically or electrically. By arranging for only one of the welding guns to contact the bus bar at a time, only one welding current cable is required to feed all the guns. This has the advantage that the automatic apparatus is rendered more portable due to the fact that the number of welding current cables, which are heavy and expensive, is cut to a minimum.

I claim:

1. An automatic welding apparatus for welding studs to a beam, comprising a carriage movable along the beam, means for moving the carriage along the beam, a plurality of welding guns mounted on the carriage means for tilting each welding gun from a welding position to a stud-accepting position, and electrical contact means positioned so as to supply electric current to each welding gun in turn when in its welding position but to be electrically isolated therefrom when in its stud-accepting position, each said tilting means comprising a rack connected with its respective welding gun, a pinion meshing with the rack, a trunnion carrying said pinion and mounting the welding gun so as to be slidable relative thereto when relative movement between the rack and pinion occurs upon rotation of the pinion, an axle carrying said pinion and pivotally mounting the trunnion on the carriage, and means for limiting sliding movement of the rack relative to the trunnion upon rotation of the pinion so that further rotation of the pinion causes the welding gun to be tilted about the axis of the axle.

2. Apparatus as claimed in claim 1, wherein the welding gun tilting means is arranged to raise and tilt each gun separately from its welding position to its stud accepting position.

3. Apparatus as claimed in claim 1, wherein the electrical contact means is a bus bar.

4. Apparatus as claimed in claim 1, wherein there is provided a motor, a plurality of cams arranged to be rotated by the motor and a plurality of gear quadrants having cam follower portions movable by said cams, each gear quadrant meshing with one of the pinions.

5. Apparatus as claimed in claim 1, wherein the carriage moving means comprises gripper means mounted on the carriage to be reciprocated relative thereto, said gripper means being arranged to engage a stud welded to the beam in order to drag the carriage along the beam to a position at which a further stud or studs is or are to be welded to the beam.

6. Apparatus as claimed in claim 1, wherein the carriage is movable along the beam on wheels and means are provided for adjusting the width of the wheel track.

7. Apparatus as claimed in claim 1, wherein means are provided for adjusting the clearance between the carriage and the beam.